May 6, 1969 N. E. MOYSE 3,442,161

CERAMIC DRILL

Filed Dec. 14, 1965

NORMAN E. MOYSE
INVENTOR
BY
BUCKHORN, BLORE, KLARQUIST & SPARKMAN
ATTORNEYS

United States Patent Office 3,442,161
Patented May 6, 1969

3,442,161
CERAMIC DRILL
Norman E. Moyse, 17168 SW. Fernwood Drive,
Lake Oswego, Oreg. 97034
Filed Dec. 14, 1965, Ser. No. 513,707
Int. Cl. B23b 51/18; B25f 1/02
U.S. Cl. 77—66            7 Claims

ABSTRACT OF THE DISCLOSURE

A ceramic drill including a tubular handle and four equally spaced, thin drill blades pivoted to the handle. A slotted slide member within the handle receives the blades within the slots, whereby the blades prevent rotation of the slide. A coil spring encompassing the blades urges camming surfaces of the blades against camming surfaces of the slide. A rotatable adjustment member extending from a rear end of the handle threadedly engages the slide so that rotation of such member slides the slide member axially and thus expands or retracts the blades. A centering pin extends longitudinally between the blades and through the slide, and is fixed to the adjustment member.

---

The present invention relates to hand drills and more particularly to a hand drill for cutting holes and marble seats of various diameters in ceramic greenware and other relatively soft materials.

Heretofore the formation of holes and marble seats of different diameters in ceramic greenware has been a problem because of the unavailability of a tool capable of forming truly round holes and seats. Furthermore no single tool capable of forming holes and seats of different diameters accurately has been available. For these reasons, the cutting of a round hole or seat of a desired size has depended largely on the skill, and luck, of the individual craftsman.

It is therefore a primary object of the present invention to provide a new and improved hand drill capable of forming both holes and marble seats of different diameters in ceramic greenware and other relatively soft materials.

Another primary object is to provide a hand drill which cuts perfectly round holes and marble seats in ceramic materials.

Still another object is to provide a drill as aforesaid which cuts holes straight through ceramic greenware.

A further object is to provide a drill as aforesaid which cuts a hole of different predetermined sizes with a high degree of accuracy.

Another object is to provide a ceramic drill which positions a hole accurately on a workpiece.

Yet another object is to provide a drill as aforesaid which is of a novel simplified construction and which is easy to operate and adjust.

A further object is to provide a drill as aforesaid having a novel blade construction which facilitates fast, accurate cutting of both through holes and marble seats with ease.

The above and other objects and advantages of my invention will become more apparent from the following detailed description, which proceeds with reference to the accompanying drawing wherein.

Figure 1:
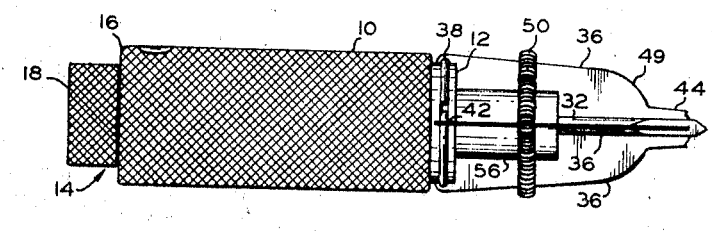
FIG. 1 is a side elevational view of a drill in accordance with my invention.
Figure 2:
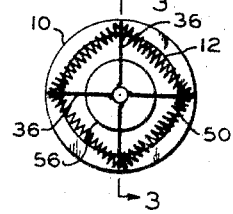
FIG. 2 is a front end view of the drill of FIG. 1.

With reference to the drawings, a preferred embodiment of my drill includes a hollow cylindrical handle, or barrel 10 having a knurled outer surface and a front end portion 12 of reduced diameter. A rotatable adjustment member 14 extends within the rear end 16 of the handle and includes a knurled adjustment knob 18 projecting from such end, an intermediate bearing section 20 bearing against the inner wall of the handle, and a screw-threaded stem section 22 extending forwardly from the bearing section. The bearing section 20 has an annular groove 24 in its surface which coincides with a small hole 26 through the handle. A retaining pin 28 extends through the hole and into the groove to prevent longitudinal movement of the adjustment member out of the handle while permitting rotation of such member by turning its knob.

The front end of stem section 22 has an axial opening 30 within which the rear end of a centering pin 32 is retained. The centering pin extends forwardly from within the handle and terminates at a spade-type point 34 at a susbtantial distance forwardly of the front end of the handle. The point is designed to cut a small pilot hole in a workpiece just ahead of a series of drill blades as the drill is rotated into the workpiece.

Figures 4, 5:
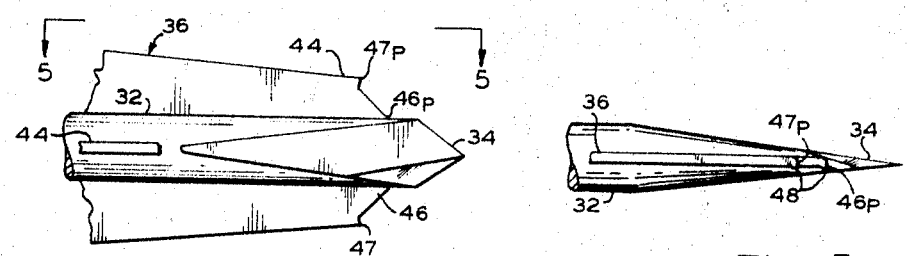
FIG. 4 is a fragmentary side view of the front end portion of the blades and centering pin of the drill on a greatly enlarged scale.
FIG. 5 is a fragmentary top view on the same scale as FIG. 4 and taken along the line 5—5 of FIG. 4.

Four relatively thin, flat drilling blades 36 are pivoted at their rear ends to the front end portion 12 of the handle by a snap ring 38 which extends through a rear eye in each blade and which is seated within an annular groove 40 in the surface of reduced handle portion 12. Handle portion 12 is also provided with four equally spaced-apart slots 42, each of which receives a rear end portion of one of the blades to space the blades equally from one another about the handle. As shown most clearly in FIG. 4, each blade has a narrow cutting portion 44 having a notched forward tip defining a pair of cutting edges 46, 47, and points 46p, 47p, one lying next adjacent the centering pin and the other spaced radially outwardly and rearwardly therefrom. This double edge and point construction enables easy and clean cutting of through holes in ceramic greenware having a thickness at least as great as the length of the tip with minimum penetration of the blade points. As will be noted from FIG. 5, another important feature of each blade is the provision of a slight lateral hook or burr at points 46p and 47p of each blade, offset on one side only of the median plane of the blade in the direction of cutting to cause the points to "bite" into a workpiece. The burrs on the points of the different blades are on corresponding sides of such blades so that whent he blades are oscillated into the work, cutting occurs in only one direction of rotation.

Figure 3:
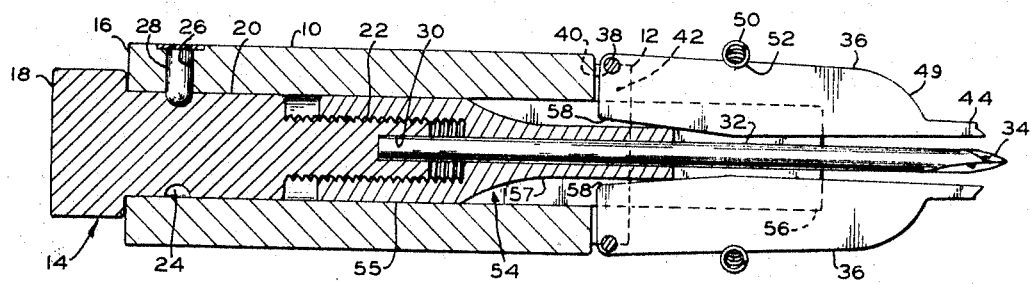
FIG. 3 is a longitudinal sectional view on an enlarged scale taken approximately along the line 3—3 of FIG. 2.

Each blade also has a rounded shoulder 49 rearwardly of its tip connecting the relatively narrow cutting portion 44 and the broader main body of the blade. This shoulder is shaped and used for cutting marble seats in a workpiece in a manner to be described. The four radially extending blades are normally biased against the centering pin 32, as shown in FIG. 1, by an endless coil spring 50 encompassing all four blades and seated within a notch 52 in the outer edge of each blade. In this position the tips of the four blades lie as close together as possible to define the smallest-diameter hole the drill is capable of cutting. However, as shown in FIG. 3, a blade-spreading member 54 mounted for axial sliding movement within the handle provides for radial separation of the four blades to increase the size of holes that can be cut thereby.

The blade-spreading member includes an internally threaded rear section 55 into which the stem of the adjustment member is threaded, a slotted cylindrical forward section 56 which slidably receives the inner edges of the four blades to help the slotted forward end of the handle position the blades, and a forwardly projecting camming portion 57 which engages inclined rear edge portions 58 of the four blades. Thus when adjustment knob 18 is turned in one direction, the blade spreader slides forwardly within the handle to cam the forward ends of the blades apart simultaneously and at the same rate about their connections to the snap ring, whereas when the knob is turned in the opposite direction, the spreader slides rearwardly and the blades are urged back together by the contractive force of the coil spring. In this manner, the distance between blade points on the different blades is adjusted for reaming holes of different diameters.

The blades, spring and centering pin are preferably made of stainless steel because of their frequent exposure to moisture, although other suitable rust-resistant materials could also be used. I prefer to make the handle and adjustment member of anodized aluminum for the sake of appearance, resistance to rust, and lightweight construction, and the blade spreader of aluminum for the latter reason also, although these materials are likewise a matter of choice.

In operation, the spade point of the centering pin is placed against a piece of ceramic greenware at the desired location after the blade points have been adjusted to their desired spread, possibly with the aid of a gauge for this purpose. The drill is then oscillated into the work until both points of each blade have penetrated and cut their way through the workpiece. To cut a marble seat, the blades are continued through the workpiece until the rounded shoulders engage the work, whereafter continued oscillation of the drill forms a concave seat at the outer end of the hole thus formed.

Having illustrated and described a preferred form of my invention, it should be apparent to those skilled in the art that the invention permits of modification in arrangement and detail. I claim as my invention all such modifications as come within the true spirit and scope of the appended claims.

I claim:

1. A hand drill for boring holes of different sizes in ceramic greenware and the like comprising:
   means defining a tubular handle portion,
   a plurality of drill blades pivoted to said handle portion and extending forwardly therefrom,
   each of said blades terminating at a blade point forwardly of said handle portion,
   means biasing said blades toward one another,
   and adjustable means for pivoting said blades about their pivotal connections to said handle portion and thereby spreading apart and closing together said blade points,
   said adjustable means including a slide member slidable axially within said handle portion,
   a rotatable adjustment member in threaded engagement with said slide member and rotatable within said handle,
   said slide member including a camming portion engaging said blades in a manner such that rotation of said adjustment member effects a radial spreading and retraction of said blade points,
   centering pin means extending axially forwardly from said handle between said blades,
   said blades being movable about their pivotal connections toward and away from said centering pin means,
   said centering pin means extending longitudinally through said slide member and being fixed to said adjustment means.

2. A drill according to claim 1 wherein said adjustment means includes a screw-threaded member and knob means externally of said handle for rotating said screw-threaded member.

3. A drill according to claim 1 including at least three blades wherein the rear ends of said blades are pivoted to the forward end of said handle portion by a snap ring extending through rear end openings in said blades and seated within an annular groove in said handle,
   said blades being equally spaced circumferentially about said handle.

4. A drill according to claim 3 wherein said biasing means comprises an annular resilient member encompassing the outer peripheries of all said blades between said blade points and said snap ring.

5. A drill according to claim 1 wherein the point portion of each blade is notched to define a pair of contiguous cutting edges, one disposed radially outwardly of the other relative to the axis extended of said handle and one disposed at a different cutting angle than the other relative to the material to be bored.

6. A drill according to claim 1 wherein each blade includes a shoulder portion rearwardly of the blade point shaped for cutting marble seats.

7. A drill according to claim 1 wherein there are four said blades, said slide member and the forward end of said handle define four equally circumferentially spaced-apart slots each receiving one of said blades in a manner such that said blades restrain said slide member against rotation within said handle portion,
   and said rotatable adjustment member includes a screw-threaded forward end portion interengaging said slide member, an intermediate bearing portion bearing against the inner wall of said handle portion, and a rear knob portion extending outwardly of the rear end of said handle.
   and means restraining said rotatable adjustment member against longitudinal movement relative to said handle portion so that rotation of said adjustment member induces longitudinal sliding movement of said slide member.

References Cited

UNITED STATES PATENTS

| 622,463 | 4/1899 | Green | 145—24 |
| 1,101,157 | 6/1914 | Wilberg | 145—123 |
| 1,390,371 | 9/1921 | Meyer | 81——72 |
| 1,797,582 | 4/1931 | McClay | 77—76 |
| 2,226,078 | 12/1940 | Spahn | 81—72 X |
| 2,360,054 | 10/1944 | Haas | 81—724 X |
| 2,732,869 | 1/1956 | Stearns | 145—125 |
| 2,747,448 | 5/1956 | McCafferty | 81—72 |
| 1,086,867 | 2/1914 | Steindl | 77—76 |
| 1,511,898 | 10/1924 | Makay | 77—76 |

HAROLD D. WHITEHEAD, *Primary Examiner.*

U.S. Cl. X.R.

145—125